(12) United States Patent
Jones

(10) Patent No.: US 6,449,782 B1
(45) Date of Patent: Sep. 17, 2002

(54) INFLATABLE AND DISPOSABLE PORTABLE TOILET ASSEMBLY

(76) Inventor: Hazel L. Jones, 5535 Fleming Ave., Oakland, CA (US) 94605

( * ) Notice: Subject to any disclaimer, the term of this patent is extended or adjusted under 35 U.S.C. 154(b) by 0 days.

(21) Appl. No.: 10/099,025

(22) Filed: Mar. 15, 2002

Related U.S. Application Data

(66) Substitute for application No. 09/653,849 on Oct. 1, 2000, now abandoned.

(51) Int. Cl.[7] .................................................. A61G 9/00
(52) U.S. Cl. ............................................................ 4/451
(58) Field of Search ..................................... 4/450–457

(56) References Cited

U.S. PATENT DOCUMENTS

| | | | |
|---|---|---|---|
| 2,087,046 A | * | 7/1937 | Rutan .............................. 4/457 |
| 2,503,284 A | * | 4/1950 | Mason ........................ 4/144.1 |
| 3,464,066 A | | 9/1969 | Marks |
| 3,513,488 A | | 5/1970 | Oring et al. |
| 3,628,197 A | * | 12/1971 | Lerenthal et al. ............... 4/451 |
| 5,129,111 A | * | 7/1992 | Feinzilberg et al. ......... 4/456 X |
| 5,224,223 A | | 7/1993 | Royal |
| 5,394,571 A | | 3/1995 | Vernon |
| D374,069 S | | 9/1996 | Her |

FOREIGN PATENT DOCUMENTS

| | | | | |
|---|---|---|---|---|
| WO | 4018928 | * | 9/1994 | ..................... 4/450 |

* cited by examiner

Primary Examiner—Charles E. Phillips

(57) ABSTRACT

An inflatable and disposable toilet assembly for providing a portable toilet especially for use while traveling. The inflatable and disposable toilet assembly includes a receptacle having a holding compartment disposed therein and also having an inner wall, an outer wall, an air chamber disposed between the inner wall and the outer wall, and an opening disposed through a top of the receptacle into the holding compartment; and also includes a flap member having an end securely attached to the receptacle and being closable over the opening in the receptacle; and further includes an air valve disposed in an end of the receptacle and through the outer wall into the air chamber.

10 Claims, 2 Drawing Sheets

INFLATABLE AND DISPOSABLE PORTABLE TOILET ASSEMBLY

RELATED APPLICATION

This application is a substitute application for U.S. application Ser. No. 09/653,849, filed Sep. 1, 2000 now abandoned.

BACKGROUND OF THE INVENTION

1. Field of the Invention

The present invention relates to a disposable travel toilet and more particularly pertains to a new inflatable and disposable toilet assembly for providing a portable toilet especially for use while traveling.

2. Description of the Prior Art

The use of a disposable travel toilet is known in the prior art. More specifically, a disposable travel toilet heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,394,571; U.S. Pat. No. Des. 374,069; U.S. Pat. Nos. 3,464,066; 5,129,111; 3,513,488; and 5,224,223.

While these devices fulfill their respective, particular objectives and requirements, the aforementioned patents do not disclose a new inflatable and disposable toilet assembly. The inventive device includes a receptacle having a holding compartment disposed therein and also having an inner wall, an outer wall, an air chamber disposed between the inner wall and the outer wall, and an opening disposed through a top of the receptacle into the holding compartment; and also includes a flap member having an end securely attached to the receptacle and being closable over the opening in the receptacle; and further includes an air valve disposed in an end of the receptacle and through the outer wall into the air chamber.

In these respects, the inflatable and disposable toilet assembly according to the present invention substantially departs from the conventional concepts and designs of the prior art, and in so doing provides an apparatus primarily developed for the purpose of providing a portable toilet especially for use while traveling.

SUMMARY OF THE INVENTION

In view of the foregoing disadvantages inherent in the known types of disposable travel toilet now present in the prior art, the present invention provides a new inflatable and disposable toilet assembly construction wherein the same can be utilized for providing a portable toilet especially for use while traveling.

The general purpose of the present invention, which will be described subsequently in greater detail, is to provide a new inflatable and disposable toilet assembly which has many of the advantages of the disposable travel toilet mentioned heretofore and many novel features that result in a new inflatable and disposable toilet assembly which is not anticipated, rendered obvious, suggested, or even implied by any of the prior art disposable travel toilet, either alone or in any combination thereof.

To attain this, the present invention generally comprises a receptacle having a holding compartment disposed therein and also having an inner wall, an outer wall, an air chamber disposed between the inner wall and the outer wall, and an opening disposed through a top of the receptacle into the holding compartment; and also includes a flap member having an end securely attached to the receptacle and being closable over the opening in the receptacle; and further includes an air valve disposed in an end of the receptacle and through the outer wall into the air chamber.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new inflatable and disposable toilet assembly which has many of the advantages of the disposable travel toilet mentioned heretofore and many novel features that result in a new inflatable and disposable toilet assembly which is not anticipated, rendered obvious, suggested, or even implied by any of the prior art disposable travel toilet, either alone or in any combination thereof.

It is another object of the present invention to provide a new inflatable and disposable toilet assembly which may be easily and efficiently manufactured and marketed.

It is a further object of the present invention to provide a new inflatable and disposable toilet assembly which is of a durable and reliable construction.

An even further object of the present invention is to provide a new inflatable and disposable toilet assembly which is susceptible of a low cost of manufacture with regard to both materials and labor, and which accordingly is then susceptible of low prices of sale to the consuming public, thereby making such inflatable and disposable toilet assembly economically available to the buying public.

Still yet another object of the present invention is to provide a new inflatable and disposable toilet assembly which provides in the apparatuses and methods of the prior art some of the advantages thereof, while simultaneously overcoming some of the disadvantages normally associated therewith.

Still another object of the present invention is to provide a new inflatable and disposable toilet assembly for providing a portable toilet especially for use while traveling.

Yet another object of the present invention is to provide a new inflatable and disposable toilet assembly which includes a receptacle having a holding compartment disposed therein and also having an inner wall, an outer wall, an air chamber disposed between the inner wall and the outer wall, and an opening disposed through a top of the receptacle into the holding compartment; and also includes a flap member having an end securely attached to the receptacle and being closable over the opening in the receptacle; and further includes an air valve disposed in an end of the receptacle and through the outer wall into the air chamber.

Still yet another object of the present invention is to provide a new inflatable and disposable toilet assembly that is easy and convenient to carry along while traveling and also allows the user to have a toilet available immediately upon demand.

Even still another object of the present invention is to provide a new inflatable and disposable toilet assembly that is easy to inflate within seconds and can be used by children as well as adults.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
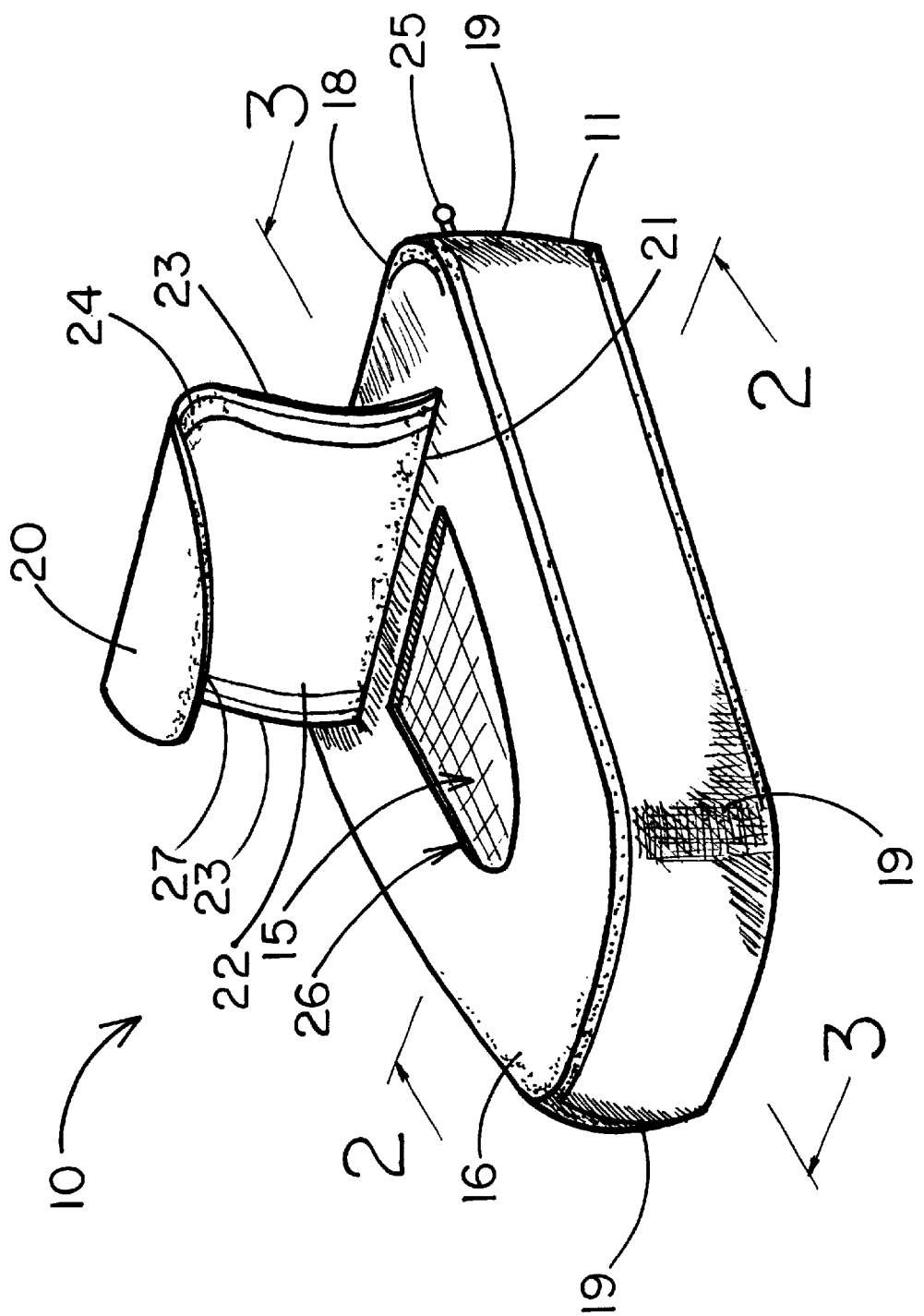
FIG. 1 is a perspective view of a new inflatable and disposable toilet assembly according to the present invention when inflated.
Figure 2:
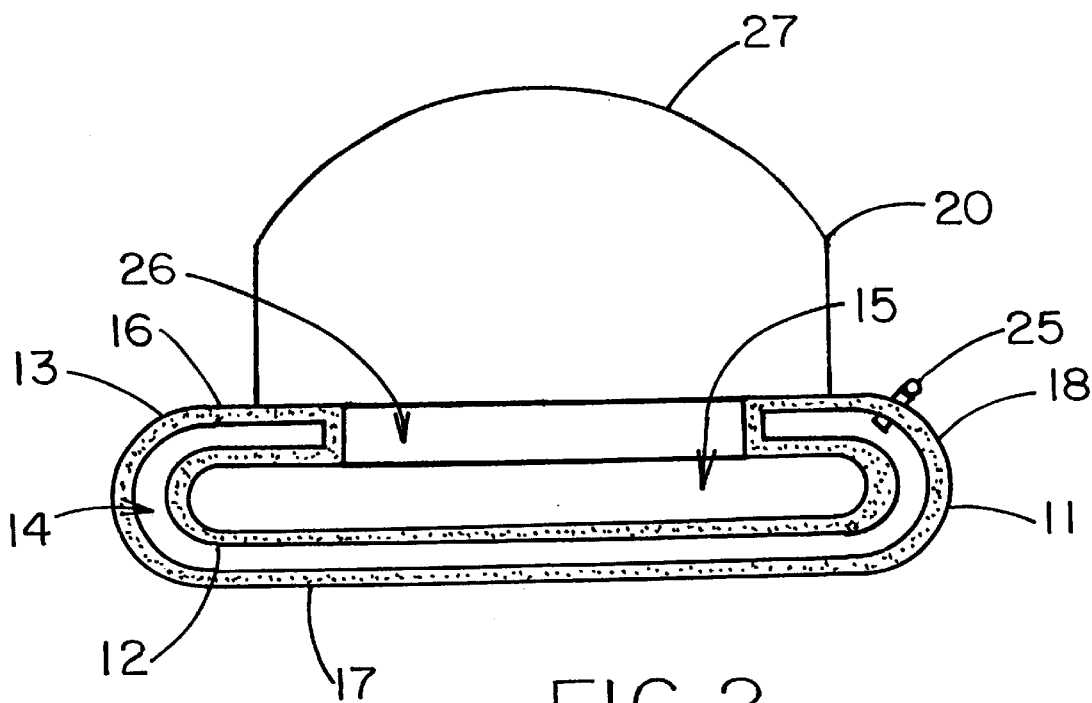
FIG. 2 is a front elevational view of the present invention.
Figure 3:
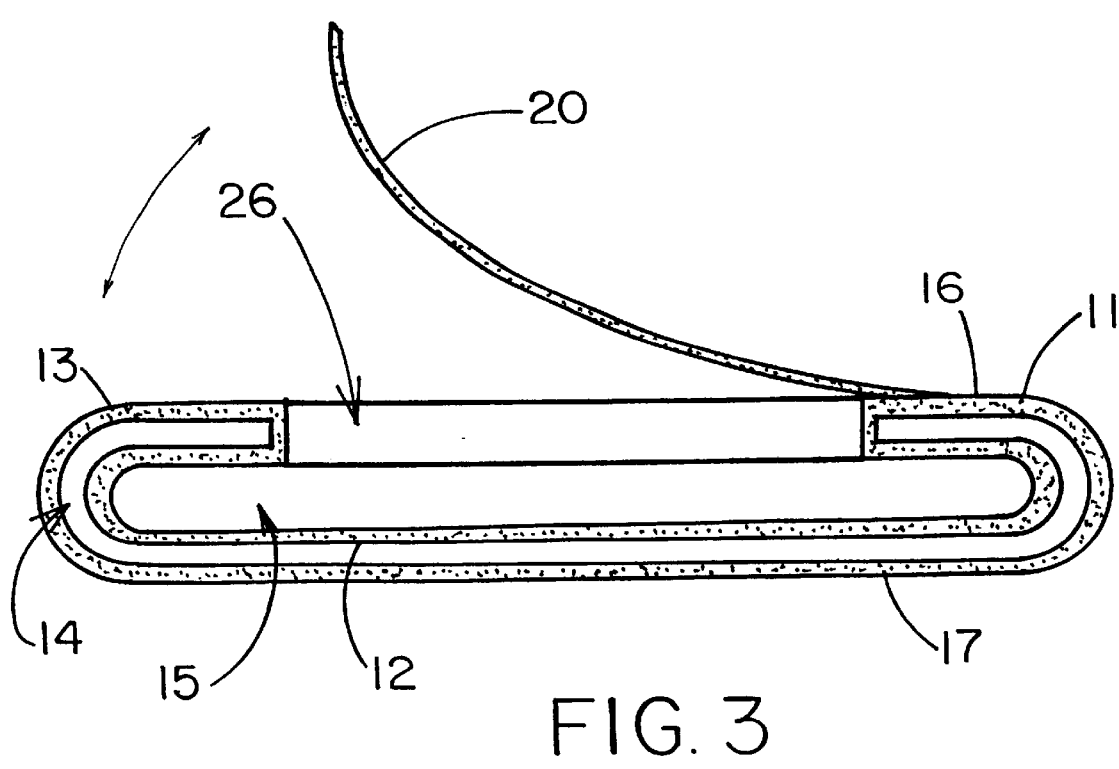
FIG. 3 is a side elevational view of the present invention.

With reference now to the drawings, and in particular to FIGS. 1 through 3 thereof, a new inflatable and disposable toilet assembly embodying the principles and concepts of the present invention and generally designated by the reference numeral 10 will be described.

As best illustrated in FIGS. 1 through 3, the inflatable and disposable toilet assembly 10 generally comprises a receptacle 11 having a top 16, a bottom 17, and a perimeter extending between the top and bottom to define a holding compartment 15 disposed therein. The receptacle also has an inner wall 12, an outer wall 13, an air chamber 14 disposed between the inner wall 12 and the outer wall 13. In one embodiment of the invention, the inner and outer walls having a substantially uniform spacing therebetween such that the air chamber has a substantially uniform thickness.

Also in one embodiment of the invention, the inner and outer walls extend along the top, bottom and perimeter of the receptacle such that the air chamber extends along the top, bottom and perimeter of the receptacle. An opening 26 is disposed through the top 16 of the receptacle 11 and into the holding compartment 15. The opening 26 is disposed through the inner and outer walls 12, 13 of the receptacle 11 such that the air chamber extends about the opening. The top 16 of the receptacle 11 may be generally flat to allow a user to comfortably sit thereupon. The receptacle 11 may also have a flat bottom 17 to allow the receptacle 11 to securely rest upon a surface when using. The receptacle 11 may also have rounded corners 19 and may be generally rectangular. The receptacle has a back end and a front end. The receptacle may have a thickness between the top and bottom, and the thickness of the receptacle may be tapered thinner from the back end to the front end when inflated with air. The perimeter of the receptacle may include a pair of sides and a pair of ends, and the receptacle may have a width between the pair of sides. In one embodiment of the invention, the width of the receptacle may taper smaller from the back end of the receptacle toward the front end of the receptacle. When inflated with air, the receptacle 11 may illustratively have a height of approximately 4 to 5 inches. The receptacle 11 may be made of a pliable plastic material.

A flap member 20 has a free first end 27 and a second end 21 which is securely attached to the receptacle 11 and is closable and sealable over the opening 26 in the receptacle 11. The flap member 20 has a bottom side 22 with adhesive 24 being disposed along a perimeter 23 of the bottom side 22 to effectively adhere the flap member 20 to the top 16 and over the opening 15 of the receptacle 11. The adhesive may be disposed in a continuous strip along the perimeter of the flap member to block movement of contents of the holding compartment through the opening in the top of the receptacle after use of the receptacle when the flap member is adhered to the top of the receptacle.

An air valve 25 is securely disposed on the receptacle 11 and through the outer wall 13 into the air chamber 14 for permitting air movement into the air chamber and selective prevention of air movement out of the air chamber.

In use, the user inflates the receptacle 11 and opens the holding compartment 15 by removing the flap member 20 from over the opening 26 and then places the receptacle 11 upon a surface for use. Once finished, the user closes and seals the flap member 20 over the opening 26 and deflates the receptacle 11 for easy disposal of the receptacle along with the contents of the receptacle. Significantly, the ability to seal the opening of the receptacle with the flap member permits the easy and sanitary disposal of the receptacle and its contents after use.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An inflatable and disposable portable toilet assembly comprising:

a receptacle having a top, a bottom, and a perimeter extending between said top and bottom to define a holding compartment disposed therein, said receptacle having an inner wall, an outer wall, and an air chamber disposed between said inner wall and said outer wall, an opening being disposed through said top of said receptacle into said holding compartment, said opening being disposed through said inner and outer walls of said receptacle such that said air chamber extends about said opening;

a flap member having a free first end and a second end which is securely attached to said receptacle and being closable over said opening in said receptacle, said flap member having a bottom side with adhesive being disposed adjacent to a perimeter of said bottom side for adhering said flap member to said top and over said opening of said receptacle; and an air valve disposed in said receptacle and through said outer wall into said air chamber for permitting air movement into said air chamber and selective prevention of air movement out of the air chamber.

2. The assembly of claim 1 wherein said adhesive is disposed in a continuous strip along the perimeter of said flap member to block movement of contents of said holding compartment through the opening in the top of said receptacle after use of said receptacle when the flap member is adhered to the top of said receptacle.

3. The assembly of claim 1 wherein said inner and outer walls have a substantially uniform spacing therebetween such that said air chamber has a substantially uniform thickness.

4. The assembly of claim 1 wherein said inner and outer walls extend along said top, bottom and perimeter of said receptacle such that said air chamber extends along said top, bottom and perimeter.

5. The assembly of claim 1 wherein said top of said receptacle is generally flat to allow a user to comfortably sit thereupon.

6. The assembly of claim 1 wherein said bottom of said receptacle is substantially flat which allows said receptacle to securely rest upon a surface when using.

7. The assembly of claim 1 wherein said receptacle has a back end and a front end, said receptacle having a thickness between said top and bottom, said thickness of said receptacle being tapered thinner from said back end to said front end when inflated with air.

8. The assembly of claim 1 wherein said receptacle has a back end and a front end, said perimeter including a pair of sides and a pair of ends, said receptacle having a width between said pair of sides, said width tapering smaller from said back end of said receptacle toward said front end of said receptacle when inflated with air.

9. The assembly of claim 1 wherein the second end of said flap member is attached to the top of said receptacle at a location adjacent to said opening, said second end being mounted between the opening of said receptacle and the back end of said receptacle.

10. An inflatable and disposable portable toilet assembly comprising:

a receptacle having a top, a bottom, and a perimeter extending between said top and bottom to define a holding compartment disposed therein, said receptacle having an inner wall, an outer wall, an air chamber disposed between said inner wall and said outer wall, said inner and outer wall having a substantially uniform spacing therebetween such that said air chamber has a substantially uniform thickness, said inner and outer walls extending along said top, bottom and perimeter of said receptacle such that said air chamber extends along said top, bottom and perimeter, an opening being disposed through said top of said receptacle into said holding compartment, said opening being disposed through said inner and outer walls of said receptacle such that said air chamber extends about said opening, said top of said receptacle being generally flat to allow a user to comfortably sit thereupon, said bottom of said receptacle being substantially flat which allows said receptacle to securely rest upon a surface when using, the perimeter of said receptacle having rounded corners, said receptacle being generally rectangular and having a back end and a front end, said receptacle having a thickness between said top and bottom, said thickness of said receptacle being tapered thinner from said back end to said front end, when inflated with air said receptacle having a height of approximately 5 inches, said receptacle being made of a pliable plastic material, said perimeter including a pair of sides and a pair of ends, said receptacle having a width between said pair of sides, said width tapering smaller from said back end of said receptacle toward said front end of said receptacle;

a flap member having a free first end and a second end which is securely attached to said receptacle and being closable over said opening in said receptacle, the second end of said flap member being attached to the top of said receptacle at a location adjacent to said opening, said second end being mounted between the opening of said receptacle and the back end of said receptacle, said flap member having a bottom side with adhesive being disposed adjacent to a perimeter of said bottom side for adhering said flap member to said top and over said opening of said receptacle, said adhesive being disposed in a continuous strip along the perimeter of said flap member to block movement of contents of said holding compartment through the opening in the top of said receptacle after use of said receptacle when the flap member is adhered to the top of said receptacle; and an air valve disposed in said receptacle and through said outer wall into said air chamber for permitting air movement into said air chamber and selective prevention of air movement out of the air chamber.

* * * * *